(12) United States Patent
Lehmann

(10) Patent No.: US 6,729,680 B2
(45) Date of Patent: May 4, 2004

(54) RETRACTABLE PICKUP TRUCK WIND DEFLECTION SYSTEM AND METHOD

(76) Inventor: Harry V. Lehmann, 4 Vineyard Ct., Novato, CA (US) 94947

( * ) Notice: Subject to any disclaimer, the term of this patent is extended or adjusted under 35 U.S.C. 154(b) by 0 days.

(21) Appl. No.: 10/133,468

(22) Filed: Apr. 29, 2002

(65) Prior Publication Data

US 2002/0163222 A1 Nov. 7, 2002

Related U.S. Application Data

(60) Provisional application No. 60/287,422, filed on May 1, 2001.

(51) Int. Cl.$^7$ ............................................... B60J 1/00
(52) U.S. Cl. ............................................... 296/180.1
(58) Field of Search ........................ 296/180.1, 100.09, 296/37.6, 50, 26.11, 100.02, 160.06

(56) References Cited

U.S. PATENT DOCUMENTS

| | | | | |
|---|---|---|---|---|
| 4,159,843 A | * | 7/1979 | Crossman | 296/180.1 |
| 4,451,075 A | * | 5/1984 | Canfield | 296/37.6 |
| 4,506,870 A | * | 3/1985 | Penn | 296/180.1 |
| 4,585,263 A | * | 4/1986 | Hesner | 296/180.1 |
| 4,884,838 A | * | 12/1989 | Slater | 296/180.1 |
| 5,069,498 A | * | 12/1991 | Benchoff | 296/180.1 |
| 5,076,636 A | * | 12/1991 | Buck et al. | 296/180.1 |
| 5,083,829 A | * | 1/1992 | Fonseca | 296/37.6 |
| 5,154,470 A | * | 10/1992 | Bringman, Jr. | 296/26.11 |
| 5,232,259 A | * | 8/1993 | Booker | 296/37.6 |
| 5,271,656 A | * | 12/1993 | Hull et al. | 296/180.1 |
| D360,395 S | * | 7/1995 | Almen | D12/181 |
| 5,435,616 A | * | 7/1995 | Corner | 296/180.1 |
| 5,498,049 A | * | 3/1996 | Schlachter | 296/37.6 |
| 5,498,058 A | * | 3/1996 | Kuo | 296/180.1 |
| 5,551,747 A | * | 9/1996 | Larsen | 296/180.1 |
| 5,722,714 A | * | 3/1998 | Vallerand | 296/180.1 |
| 5,735,567 A | * | 4/1998 | Mora, Sr. | 296/180.1 |
| 5,743,589 A | * | 4/1998 | Felker | 296/180.5 |
| 6,206,444 B1 | * | 3/2001 | Casey | 296/180.1 |
| 6,325,448 B1 | * | 12/2001 | Estrada et al. | 296/180.1 |
| 6,517,140 B2 | * | 2/2003 | Wilde | 296/180.1 |
| 2002/0101088 A1 | * | 8/2002 | Rigau | 296/37.6 |
| 2002/0163223 A1 | * | 11/2002 | Lehmann | 296/180.1 |

* cited by examiner

*Primary Examiner*—Kiran Patel
(74) *Attorney, Agent, or Firm*—Duane Morris LLP

(57) ABSTRACT

A system and method for deflecting the wind which would otherwise impinge upon the tailgate of a pickup truck, the deflector being mounted externally of the truck bed to preserve cargo space, including a spoiler and including a retractable fabric for deflecting the wind.

17 Claims, 1 Drawing Sheet

RETRACTABLE PICKUP TRUCK WIND DEFLECTION SYSTEM AND METHOD

RELATED APPLICATIONS

This application is related to and claims the priority of U.S. Provisional Patent Application Ser. No. 60/287,422 entitled "Tailgate Sail" filed May 1, 2001, the disclosure of which is incorporated herein by reference.

BACKGROUND OF THE INVENTION

The present invention relates to a system and method for deflecting the wind which would otherwise impinge upon the tailgate of a pickup truck.

The adverse effects of wind on the forward facing surface of the tailgate of a pickup truck are well known and many have addressed the problem by providing a rearwardly and upwardly inclined surface deflecting the wind up and over the tailgate when the truck bed is not filled with cargo. Often, such deflectors are in combination with the definition of storage areas (see, e.g. the Canfield U.S. Pat. No. 4,451,075 and the Kuo U.S. Pat. No. 5,498,058), loading ramps (see, e.g. the Slater U.S. Pat. No. 4,884,838), etc. and thus require substantial modification of the truck bed and/or tailgate. Many of the single function devices also require modification of the truck bed and/or the tailgate of the pickup truck to store the deflector when not deployed (see, e.g. the Corner U.S. Pat. No. 5,435,616).

Others such as that disclosed in the Larsen U.S. Pat. No. 5,551,747 address the storage problem by providing a false floor which is hinged to the bed at the front end thereof so that the rear end thereof may be selectively raised and lowered. In addition to the requirement that the bed of the truck be modified, the presence of the deflector on the bed is problematical and an unsatisfactory gap is created between the raised end of the deflector and the tailgate.

Other known attempts to address the storage problem have constructed the deflector in two panels and telescoped one panel within the other panel so that the telescoped panels may be stored flat against the closed tailgate when not deployed. Examples of such deflectors are disclosed in the Benchoff U.S. Pat. No. 5,069,498 and the Mora, Sr. U.S. Pat. No. 5,735,567. These telescoping devices necessarily have substantial thickness inasmuch as the telescoped panel must have sufficient structural integrity to resist the substantial pressure of the relative wind generated by high speed driving, and the telescoping panel must overlie and structurally support the telescoped panel. Still additional thickness is required if the assembly includes laterally extendable panels to accommodate truck beds of different widths, and the construction of such complicated assemblies is generally expensive.

Attempts to address the storage problem without resorting to telescoping structures include the hinging of the two panels and the folding thereof against the closed tailgate. As disclosed, for example, in the Vallerand U.S. Pat. No. 5,722,714, the maintenance of the panels in the deployed position is accomplished by fastening the distal end of the forward panel to the truck bed. This requires modification of the truck bed and increases the difficulty in deploying and storing the deflector. Depressions in the truck bed accumulate dirt and debris which must be removed before the deflector can be stored. The storage of such devices may also interfere with the storage of a spare tire.

Still other systems such as disclosed in the Felker U.S. Pat. No. 5,743,589 avoid the necessity for attaching the distal end of the forward panel to the truck bed by making the panels sufficiently rigid and thick, and by the location of the hinges used to connect the panels that the abutting edges of the panels limit the rotation of the forward panel upwardly beyond the plane of the rear panel. The force of the relative wind is concentrated on the hinged junction, and, in general, such structures have proven unsatisfactory because of the thickness and strength of materials required to mechanically resist the force of the relative wind. Such structures do not address the gusting problem, apparently depending on the weight of the deflector to maintain the distal end of the lower panel in contact with the truck bed and thus add unwanted weight to the truck.

Accordingly, it is an object of the present invention to obviate many of the above problems in known systems and to provide a novel system and method for deflecting the relative wind from the closed tailgate of a pickup truck.

It is another object of the present invention to provide a novel wind deflector and method that permits the use of a thin, lightweight flexible membrane capable of resisting the relative wind and the gusts associated with the operation of the truck.

It is yet another object of the present invention to provide a novel wind deflector and method that requires minimum cargo space, requires no interfering modification of the truck bed and requires no modification of the tailgate.

It is still another object of the present invention to provide a novel wind deflector and method in which the deflector is stored externally of the bed of the truck so as to avoid negatively impacting the cargo carrying capacity of the truck.

It is a further object of the present invention to provide a novel wind deflector and method in which the angle of the deflector relative to the truck bed may easily be adjusted to accommodate different sized truck beds and the partial loading of cargo therein.

It is an additional object of the present invention to provide a novel wind deflector and method for integrating a spoiler into the deflector.

It is yet an additional object of the present invention to provide a novel stand-alone lightweight wind deflector which may be easily and quickly installed and removed from the tailgate of a pickup truck.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
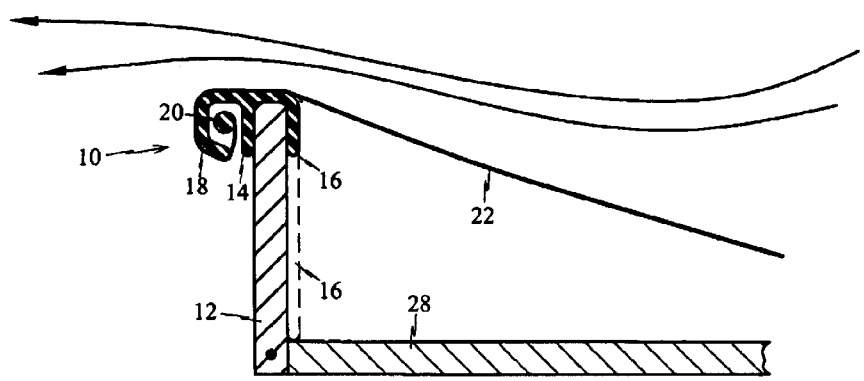
FIG. 1 is an elevation in cross-section illustrating one embodiment of a wind deflector of the present invention
Figure 2:
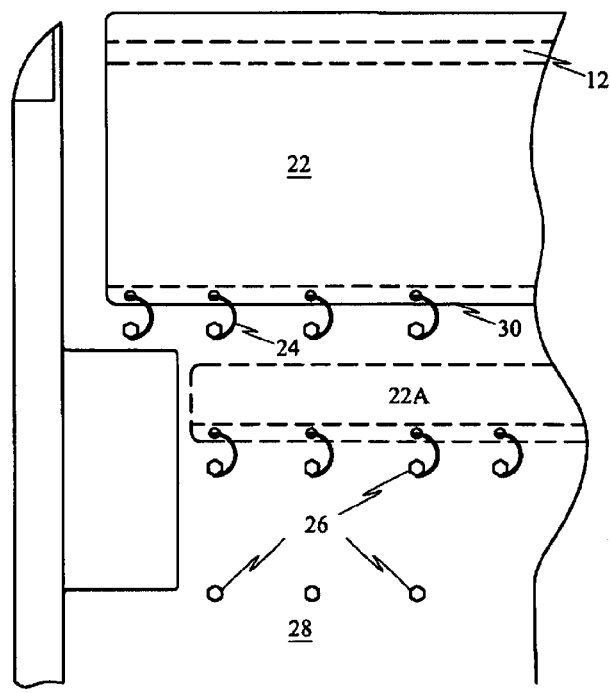
FIG. 2 is a partial top plan view of the wind deflector of FIG. 1 deployed.

Referring to the Figures where like numerals represent like components, the deflector 10 is shown overlying the top of a closed tailgate 12. The deflector 10 may be retained on the tailgate 12 in any suitable conventional way, preferably by frictional engagement of the arms 14, 16 with the tailgate 12 across the entire width thereof, and may be made of any suitable material such as a molded high impact plastic. It has been found desirable to extend the inner arm 16 substantially to the truck bed as shown in dashed lines in FIG. 1. The additional height provided when the tailgate approximates the thickness of a truck bed liner and reduces the risk of interference with the unloading of cargo. This extension also provides the opportunity to insert a conventional fastener such as a self-tapping metal screw through the extension into the tailgate as a safety measure.

The deflector extends rearwardly from the tailgate 12 to form a spoiler for the air exiting the truck bed and then downwardly to form an elongated cavity or slot between the arms 18 and 14 that extends across the width of the tailgate 14. A shaft 20 is journaled for rotation about the longitudinal axis thereof within the slot and is provided with suitable conventional means at one or both ends thereof for rotationally biasing the shaft. A suitable flexible material 22 such a sheet of high tensil strength plastic, desirably reinforced with glass or metal fibers, or a tightly woven fabric is fixedly attached to the shaft 20 and wound thereon by the rotational bias applied to the shaft. The free end of the material 20 may be provided with an enlarged stop to limit the rotation of the shaft and provide ready finger access to the material 22 so that it may be withdrawn from the slot against the rotational bias applied to the shaft.

The free end of the material 22 may be provided with any suitable conventional latching means 24 configured to mate with corresponding means 26 attached to the bed 28 of the pickup truck, desirably in a manner to minimize the collection of debris thereon. The bed may be provided with several sets of latches 26 so that the free end of the material 22 may be attached to the bed 28 at different distances from the tailgate 12. The free end of the material is desirably provided with a suitable conventional stiffening member 30 so that the number of latches necessary to keep the entirety of the free end in proximity to the bed can be reduced and can be reached by a person standing on the ground beside the truck.

Of course, the shape of the material may be customized for the location of the wheel wells of a particular truck bed, and the lateral portions of the material may be folded inwardly to reduce the effective width of the material. Where the width of the material conforms to the distance between the wheel wells, additional side pieces may be removably secured to the material and the truck body, e.g., by snaps or buttons.

While preferred embodiments of the present invention have been described, it is to be understood that the embodiments described are illustrative only and that the scope of the invention is to be defined solely by the appended claims when accorded a full range of equivalence, many variations and modification naturally occurring to those of skill in the art from a perusal hereof.

What is claimed is:

1. In a selectively deployable wind deflector for the closed tailgate of the truck bed of a pickup truck which extends substantially across the width of the truck bed from a first position adjacent the top of the closed tailgate downwardly and forwardly to a second position adjacent the truck bed at a point rearward of the midpoint between the front and rear ends of the truck bed to reduce the drag caused by the tailgate as the pickup truck moves forwardly through the air, the improvement wherein the deflector is a retractable fabric carried by the tailgate.

2. The wind deflector of claim 1 wherein the retractable fabric is resiliently biased toward the top of the tailgate.

3. The wind deflector of claim 1 wherein the retractable fabric passes over the top of the tailgate to a position rearward thereof to thereby provide a rearwardly extending spolier.

4. In a selectively deployable wind deflector for the closed tailgate of the truck bed of a pickup truck which extends substantially across the width of the truck bed from a first position adjacent the top of the closed tailgate downwardly and forwardly to a second position adjacent the truck bed at a point rearward of the midpoint between the front and rear ends of the truck bed to reduce the drag caused by the tailgate as the pickup truck moves forwardly through the air, the improvement wherein the deflector is carried by the tailgate rearwardly thereof when in an undeployed position so as not to interfere with the cargo carrying capacity of the truck bed.

5. The wind deflector of claim 4 wherein the forwardmost portion of the deflector is detachably secured to the truck bed at a plurality of spaced apart points across the width thereof.

6. The wind deflector of claim 5 wherein the deflector is detachably secured to the truck bed by at least one latch adjacent opposite sides of the deflector.

7. The wind deflector of claim 5 including a stiffening member adjacent the free end of the deflector.

8. A selectively deployable wind deflector for the closed tailgate of the truck bed of a pickup truck comprising:

a flexible membrane having a width substantially coexistent with the width of the truck bed and a length not less than about one third of the length of the truck bed, said membrane being carried by the tailgate when not deployed, and said membrane when deployed being attached at one end to the tailgate and being selectively detachable at the other end thereof to the truck bed at a plurality of spaced points across the width thereof.

9. The deflector of claim 8 wherein said membrane is carried externally of the truck bed when not deployed so as to avoid interference with the cargo carrying capacity of the truck bed.

10. The deflector of claim 8 including a shaft;

wherein said membrane is secured to said shaft at said one end; and including resiliently biasing means for rotating said shaft to thereby roll said membrane around said shaft when not deployed and to permit the unrolling of said membrane from said shaft to deploy the membrane.

11. The deflector of claim 8 wherein the width of said membrane is greater at said one end to substantially conform to the width of the truck bed above the wheel wells of the pickup truck and less at said other end to conform to the width of the truck bed between the wheel wells of the pickup truck.

12. A self contained removable wind deflector for a pickup truck comprising:

a housing adapted for frictional attachment to the top of the tailgate of a pickup truck;

a shaft carried internally of said housing for rotation about the longitudinal axis thereof;

a membrane attached at one end to said shaft, said membrane generally conforming in width to the width of the truck bed;

means for resiliently biasing said shaft to rotate to roll up said membrane thereon, to thereby form a self contained unit selectively positioned on the tailgate of the pickup truck from which the membrane may selectively be withdrawn to provide a wind deflector for the closed tailgate of the truck bed of a pickup truck.

13. A method of reducing the drag caused by the closed tailgate of a pickup truck as the pickup truck moves forwardly through the air comprising the steps of:

(a) providing a flexible wind deflector having a width substantially coextensive with the width of the truck bed and a length not less than about three feet;

(b) mounting the deflector adjacent the top of the closed tailgate in a rolled up condition;

(c) manually unrolling the deflector; and (d) attaching the distal end of the deflector to the truck bed at a plurality of spaced apart points on the truck bed, to thereby deploy the deflector in position to deflect wind upwardly and rearwardly out of contact with the closed tailgate as the pickup truck moves through the air.

14. The method of claim 13 wherein the deflector is mounted rearwardly of the tailgate to thereby provide a spoiler rearwardly extending from the top of the tailgate.

15. A method of reducing the drag caused by the closed tailgate of a pickup truck as the pickup truck moves forwardly through the air without compromising the cargo carrying capacity of the truck bed when the deflector is not deployed, the method comprising the steps of:

(a) providing a flexible wind deflector having a width substantially coextensive with the width of the truck bed and a length not less than about one third of the length of the truck bed;

(b) securing one end of the deflector adjacent the top of the closed tailgate rearwardly of the truck bed;

(c) selectively securing the other end of the deflector to the truck bed at a plurality of spaced apart points on the truck bed to thereby retain the deflector in a deployed position; and (d) selectively retracting the deflector to a position external of the truck bed to store the deflector external of the truck bed when not in a deployed position;

to thereby avoid compromising the cargo capacity of the truck bed when the deflector is not deployed.

16. The method of claim 15 wherein the deflector is detachably secured to the tailgate to thereby facilitate removal of the deflector from the pick up.

17. The method of claim 15 including the further step of resiliently biasing the deflector toward the tailgate.

* * * * *